US012747097B2

(12) United States Patent
Abadie et al.

(10) Patent No.: US 12,747,097 B2
(45) Date of Patent: Sep. 29, 2026

(54) WASTE COLLECTION MANAGEMENT APPARATUS AND METHOD, A WASTE COLLECTION VEHICLE, AND A METHOD FOR ANALYZING WASTE

(71) Applicant: LIXO, Paris (FR)

(72) Inventors: Étienne Abadie, Paris (FR); Marc Bernard, Paris (FR); Megan Fillion, Paris (FR); Tom François, Paris (FR); Alexandre Kempf, Paris (FR); Olivier Large, Paris (FR); Loic Macherel, Paris (FR); Paul Pister, Paris (FR)

(73) Assignee: LIXO, Paris (FR)

( * ) Notice: Subject to any disclaimer, the term of this patent is extended or adjusted under 35 U.S.C. 154(b) by 275 days.

(21) Appl. No.: 18/523,830

(22) Filed: Nov. 29, 2023

(65) Prior Publication Data

US 2025/0171227 A1 May 29, 2025

(51) Int. Cl.
*B65F 3/14* (2006.01)

(52) U.S. Cl.
CPC .......... *B65F 3/14* (2013.01); *B65F 2003/146* (2013.01)

(58) Field of Classification Search
CPC ..... B65F 3/14; B65F 2003/146; G06Q 10/04; G06Q 10/06395; G06Q 10/30
See application file for complete search history.

(56) References Cited

U.S. PATENT DOCUMENTS

2009/0169348 A1* 7/2009 Maruca .............. G06Q 10/0637 348/148
2014/0379588 A1* 12/2014 Gates .................... G06T 7/0008 705/308
2019/0295292 A1* 9/2019 Oliva-Perez ............ B60R 11/04
2020/0034785 A1* 1/2020 Romano .............. G06N 3/0464
2020/0175556 A1* 6/2020 Podgorny ............ G06Q 10/047
2021/0158308 A1* 5/2021 Armstrong ............. G06Q 10/30
2022/0177220 A1* 6/2022 Price ...................... G06V 10/70
2022/0180330 A1* 6/2022 Dietrich .................... G06T 7/70

* cited by examiner

*Primary Examiner* — Stephen G Sherman
(74) *Attorney, Agent, or Firm* — Conley Rose, P.C.

(57) ABSTRACT

Using a waste management apparatus mounted on a waste collection vehicle, images of the waste dumped into a hopper are acquired. Objects are detected and a class is assigned to each object in a predefined classification e.g. using an AI module. New objects are determined amongst the detected objects and information about the new objects are sent to a remote server, where each new object is mapped to an expected type of waste collection tour, suing a mapping table where sorting rules are stored. An actual type of waste collection tour is obtained, and a rate of waste contamination is calculated for a given location of the waste collection vehicle during a given waste collection tour as a function of the number of new objects identified, which classes are mapped with an expected type of waste collection tour other than the actual type of the given waste collection tour.

14 Claims, 4 Drawing Sheets

WASTE COLLECTION MANAGEMENT APPARATUS AND METHOD, A WASTE COLLECTION VEHICLE, AND A METHOD FOR ANALYZING WASTE

TECHNICAL FIELD

Various example embodiments relate generally to apparatus and methods for collecting waste, managing the waste being collected and analyzing the waste which has been collected.

BACKGROUND

Waste collection is commonly organized in waste collection tours run by waste collection vehicles. During a waste collection tour, a waste collection vehicle collects waste at several waste collection points. A waste collection tour is often dedicated to a type of waste, for example glasses, selected waste, residual waste etc . . . . Some waste collection vehicles are equipped to run two waste collection tours in parallel for example a tour dedicated to selected waste and a tour dedicated to residual waste.

There is a need for waste collection companies and their customers to obtain added value information about the waste collected during a waste collection tour. For example, such information can be used to take improvement actions impacting the sorting quality by the end user.

SUMMARY

According to some aspects, there is provided the subject matter of the independent claims. Some further aspects are defined in the dependent claims.

In a first aspect, a waste management apparatus is disclosed. The disclosed apparatus is to be mounted on a waste collection vehicle equipped with at least one optical sensor configured to acquire images of waste entering the waste collection vehicle, the waste management apparatus comprising at least one memory and at least one processor configured to process at least part of the acquired images to: detect one or more objects, for each object detected in a given image, provide at least a class in a classification of objects, determine, amongst the detected objects, new objects entering the waste collection vehicle, and send to a remote server information about the new objects, comprising at least the class of the new object, a time and a location of the waste collection vehicle when the new object entered the waste collection vehicle.

In an embodiment, the disclosed waste management apparatus is configured to control the at least one optical sensor to acquire images continuously while the waste collection vehicle is in service.

In an embodiment, the disclosed waste management apparatus is configured to determine if the waste collection vehicle is in motion and disregard new objects identified from images acquired while the waste collection vehicle is in motion.

In an embodiment, of the disclosed waste management apparatus, the object classification relates to sorting rules so that a type of waste collection tour can be determined from the classes of the objects collected during a given waste collection tour.

In an embodiment, the disclosed waste collection management apparatus is to be mounted on a waste collection vehicle arranged to collect waste for at least two types of waste collection tours and it is configured to determine, from the acquired images, the type of waste collection tour associated with the new objects, and to include an indication of the type of waste collection tour in the information sent to the remote server.

In an embodiment, the disclosed waste management apparatus is configured to determine from the acquired images a type of entrance into the waste collection vehicle amongst at least the following: manual entrance, thrown from a bin lifted by the waste collection vehicle, thrown from a bin lifted manually or dumped from a container of a sorting terminal, and to include said type of entrance in the information sent to the remote server.

In an embodiment, the disclosed waste management apparatus is configured to provide, for each object detected in a given image, a position in said given image. And determining new objects entering the waste collection vehicle comprises: storing, in a memory, records corresponding to objects detected in previous images, a given record comprising at least the position of the given object in the given previous image and information descriptive of the given object; for each detected object in the current image, comparing the position and the descriptive information of the detected object with the records in the memory, when no match is found determine that the detected object is a new object; and storing in the memory a new record corresponding to the detected object in the current image.

In an embodiment of the disclosed waste management apparatus, the comparison of the position and the descriptive information of the detected object with the records in the memory takes into account an estimation of movement of the detected object.

In an embodiment of the disclosed waste management apparatus, the acquired images are processed through a machine learning module, the machine learning module detecting objects in a given image, and providing for each detected object, at least the class of the detected object and an object identifier that uniquely identifies the detected object, an object being determined as a new object when the object identifier is different from the identifiers of the objects detected in previous images.

In a second aspect, a waste collection vehicle is disclosed which comprises a waste management apparatus as disclosed in any combination of the above mentioned embodiments.

In a third aspect, a computer implemented method for managing waste at a waste collection vehicle. The disclosed method comprises at least acquiring images of waste entering the waste collection vehicle and processing the acquired images to: detect one or more objects; for each object detected in a given image, provide at least a position of the object in said given image and an object class in a classification of objects; Identify, amongst the detected objects, new objects entering the waste collection vehicle; and send to a remote server information about the new objects, comprising at least the class of the new object, a time and a location of the waste collection vehicle when the new object entered the waste collection vehicle.

In a fourth aspect, a computer program product is disclosed comprising instructions which when executed by an apparatus cause the apparatus to perform at least the steps of a method as disclosed herein for managing waste at a waste collection vehicle.

In a fifth aspect, non-transitory storage medium is disclosed, for storing a computer a computer program comprising instructions which when executed by an apparatus cause the apparatus to perform at least the steps of a method as disclosed herein for managing waste at a waste collection vehicle.

In a sixth aspect, a computer implemented method for analyzing waste is disclosed which comprises at least: receiving from a waste management apparatus, information about new objects entering a waste collection vehicle during a given waste collection tour, said information comprising at least, for each new object, an object class in a classification of objects, a time and a location of the waste collection vehicle when the new object entered the waste collection vehicle; mapping the class of the new objects with an expected type of waste collection tour based on sorting rules stored in a table; obtaining an actual type of the given waste collection tour; calculating a rate of waste contamination for a given location of the waste collection vehicle during the given waste collection tour as a function of the number of new objects identified at said given location which classes are mapped with an expected type of waste collection tour other than the actual type of the given waste collection tour; providing the rate of waste contamination.

In an embodiment, the method for analyzing waste as disclosed herein further comprises determining the actual type of a given waste collection tour from the distribution of the classes of the new objects entering a waste collection vehicle during the given waste collection tour.

In an embodiment of the method for analyzing waste as disclosed herein, the information received from the waste management apparatus comprises, for each new object, an indication of the actual type of waste collection tour associated with the new object.

In another aspect, a computer program product is disclosed comprising instructions which when executed by an apparatus cause the apparatus to perform at least the steps of a method as disclosed herein for analyzing waste at a remote server.

In yet another aspect, a non-transitory storage medium is disclosed, for storing a computer a computer program comprising instructions which when executed by an apparatus cause the apparatus to perform at least the steps of a method as disclosed herein for analyzing waste at a remote server.

BRIEF DESCRIPTION OF THE DRAWINGS

Example embodiments will become more fully understood from the detailed description given herein below and the accompanying drawings, which are given by way of illustration only and thus are not limiting of this disclosure.

DETAILED DESCRIPTION

Figure 1:
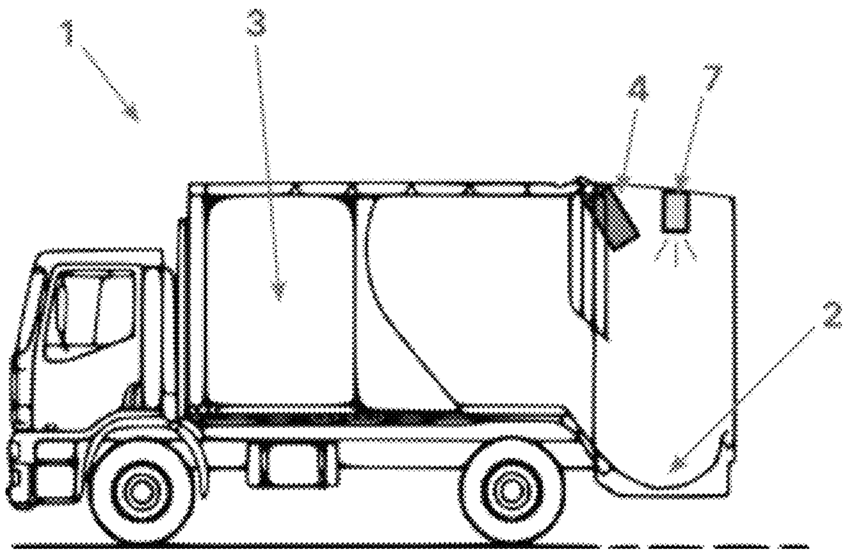
FIG. 1 is a schematic representation of a side view of waste collection vehicle.

Various example embodiments will now be described more fully with reference to the accompanying drawings in which some example embodiments are shown.

Detailed example embodiments are disclosed herein. However, specific structural and functional details disclosed herein are merely representative for purposes of describing example embodiments. The example embodiments may, however, be embodied in many alternate forms and should not be construed as limited to only the embodiments set forth herein. Accordingly, while example embodiments are capable of various modifications and alternative forms, the embodiments are shown by way of example in the drawings and will be described herein in detail. It should be understood, however, that there is no intent to limit example embodiments to the particular forms disclosed.

Figure 2:
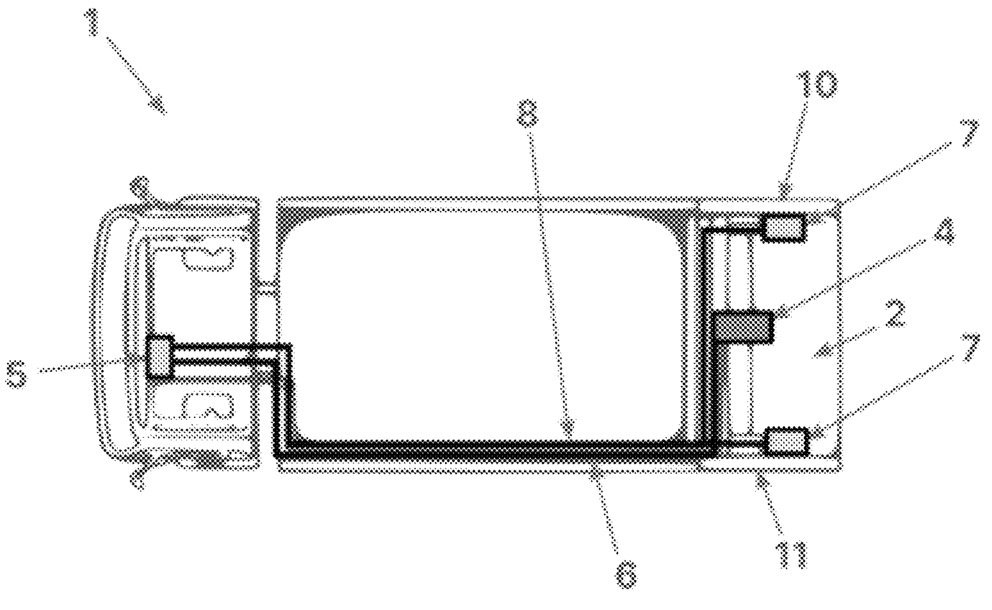
FIG. 2 is a schematic representation of a top view of a waste collection vehicle.

A waste collection vehicle 1 is represented in FIG. 1 and FIG. 2 by way of example. It comprises a hopper 2 into which the waste is to be dumped, at least one dumpster 3 into which the waste dumped into the hopper 2 is pushed, and a bin lifter (not shown in FIG. 1) which tilts the bin to enable the waste contained in the bin to be dumped into the hopper 2.

The waste collection vehicle further comprises one or more optical sensors 4 configured to capture images of the waste dumped into the hopper 2, and a waste collection management apparatus 5 comprising at least one memory and at least one processor configured to process the acquired images. The waste collection vehicle 1 further comprises a location device (not represented in FIG. 1 and FIG. 2), which can be part of the apparatus 5 or can be placed outside of the apparatus 5 in the vehicle 1.

For example, the apparatus 5 is located inside the cabin of the vehicle and it is configured to provide the electrical interface between the optical sensor(s) 4 and the vehicle electrical system.

The apparatus 5 is communicatively coupled with the optical sensor(s) 4 to allow for the transmission of the images acquired by the optical sensor(s) 4 to the apparatus 5. In the example of FIG. 1 and FIG. 2, the apparatus 5 is connected to the optical sensor(s) 4 via an Ethernet PoE (Power over Ethernet) connection 6 which provides both an electrical and a communication support to the optical sensor (s) 4. Alternatively, the apparatus 5 and the optical sensor(s) 4 can communicate through a wireless link.

In an embodiment, the vehicle 1 also comprises one or more lighting source(s) 7 mounted on one or more walls 10 of the vehicle 1 to illuminate an area around the hopper 2 thereby facilitating the acquisition of the images by the optical sensor(s) 4. In the example of FIG. 1 and FIG. 2, the apparatus 5 provides the electrical interface between the lighting sources 7 and the vehicle 1.

For example, the one or more optical sensors 4 are cameras arranged to capture in their field of view the waste dumped into the hopper 2 and the interior of hopper 2. In some embodiment, the one or more cameras are arranged to capture additional elements such as the bin, or one or more vehicle parts which position provide meaningful information for the purpose of managing or analyzing the waste being collected. For example, the position of the bin, or the color of the bin, or the position of a vehicle part can be used to derive a type of waste collection tour as will be further described below.

In the example of FIG. 1 and FIG. 2, one camera is used which is fixed to the top wall of the vehicle 1. It is possible to use a plurality of cameras to acquire different views of the waste being collected.

Figure 3:
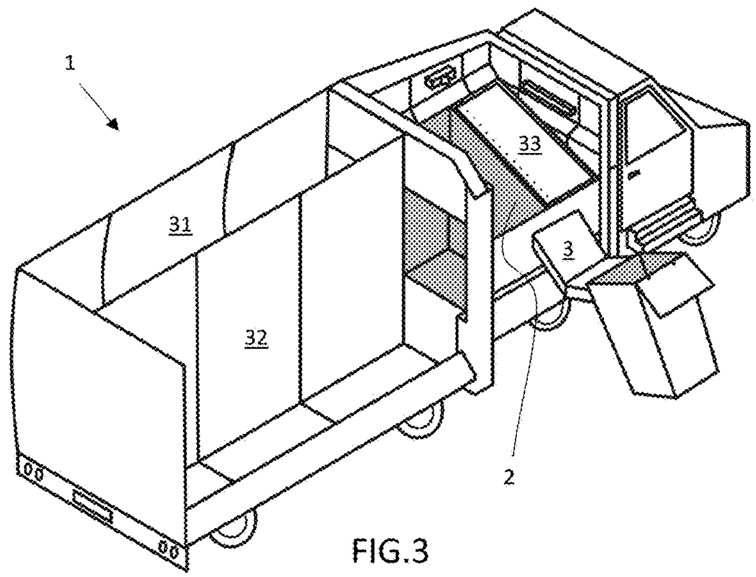
FIG. 3 is a schematic representation of a waste collection vehicle comprising two dumpster compartments.

A waste collection vehicle as disclosed herein may comprise a plurality of dumpster compartments to handle a plurality of types of waste collection tour in parallel. FIG. 3 illustrates an example of waste collection vehicle comprising two dumpster compartments 31 and 32 to handle two types of waste collection tour in parallel. In the example illustrated in FIG. 3, the hopper 2 and the bin lifter 3 are positioned on the side of the waste collection vehicle and the waste collection vehicle comprises a vehicle part 33 arranged to selectively push the waste dumped into the hopper in one of the two dumpster compartments 31 or 32.

Figures 4A, 4B:
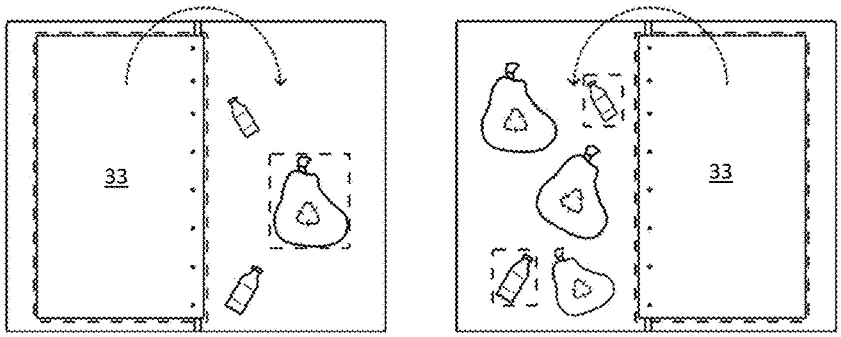
FIG. 4A and FIG. 4B are two top views of a hopper of a first example of dual-stream waste collection vehicle.
Figures 5A, 5B:
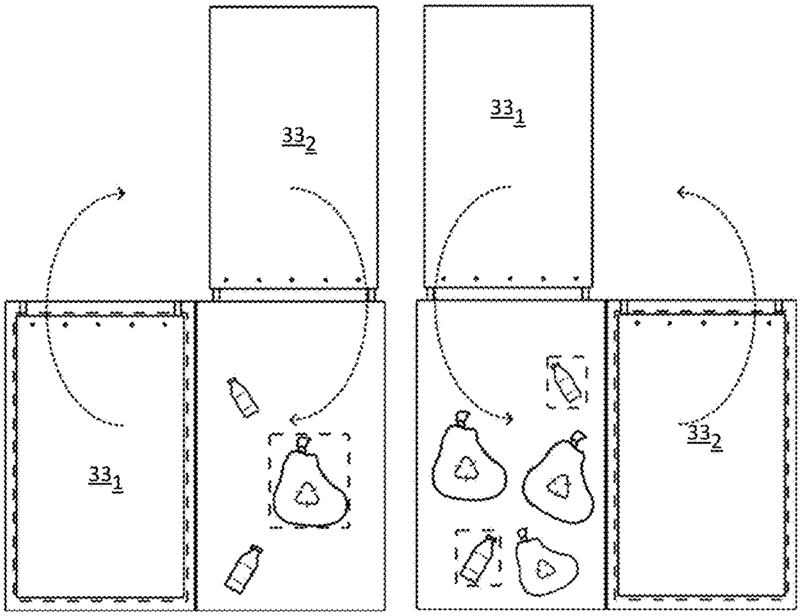
FIG. 5A and FIG. 5B are two top views of a hopper of a second example of dual-stream waste collection vehicle.

For example, as illustrated in FIG. 4A and FIG. 4B, the vehicle part 33 can be a sliding or a tipping hatch or any other equivalent means which can take one of two positions to selectively open one of the two dumpster compartments 31 or 32. Depending on the position of the vehicle part 33, the waste dumped into the hopper 2 is pushed in one of the two dumpster compartments 31 or 32. In another example, illustrated in FIG. 5A and in FIG. 5B, the vehicle part 33 comprises one hatch for each dumpster compartment 331 and 332 respectively, which are controlled to selectively open one of the two dumpster compartments 31 or 32. In the figures, the objects which constitute contaminating objects are highlighted with a dotted line box. An object is considered contaminating when it is not sorted correctly and consequently is not dumped in the appropriate dumpster. For example, in FIG. 4A the waste bag is a contaminating object as the dumpster is dedicated to a waste collection tour for collecting glasses. In FIG. 4B, the bottles are contaminating objects, as the dumpster is dedicated to a waste collection tour to collect residual waste.

Figure 6:
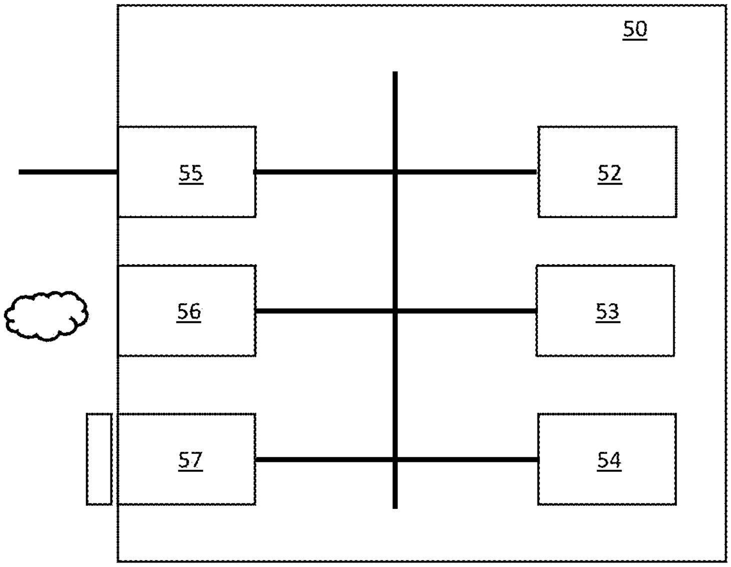
FIG. 6 is block diagram of a waste collection management apparatus to be mounted on a waste collection vehicle.

FIG. 6 depicts a high-level block diagram of a waste collection management apparatus 5 suitable for implementing a waste management method as disclosed herein. According to the exemplary embodiment depicted in FIG. 6, the apparatus 5 comprises a printed circuit board 60 on which a communication bus 61 connects a processor 62, a random access memory 63, a storage medium 64, a wired communication interface 65 to connect to one or more optical sensor(s), a wireless interface 66 to connect to a remote server and optionally, depending on the functionalities required, one or more connectors 67 to connect external modules such as e.g. a USB key, a display, a keyboard, a mouse etc. The storage medium 64 contains software code which, when executed by the processor 62, causes the apparatus to perform the method disclosed herein. The processor 62 may be any type of processor, preferably including a GPU to enable execution of the AI model in real time. In addition, the apparatus 5 may include other components typically found in computing systems, such as an operating system, queue managers, device drivers, or one or more network protocols that are stored in memory 64 and executed by the processor 62. Although not depicted in FIG. 6 for simplicity, the printed circuit board 60 further comprises an electrical bus to power the various components of the printed circuit board. The electrical bus has at least one interface to receive power from an external source/transmit power to one or more external devices. For example, the apparatus 5 is powered by the waste collection vehicle 1 and provides power to the optical sensor(s) 4 and the lighting source(s) 7.

Advantageously, images are acquired continuously by the optical sensor(s) 4 while the waste collection vehicle 1 is in service (rather than being acquired upon reception of a triggering signal e.g. a triggering signal indicative of a start of the waste collection at a waste collection point). With the disclosed embodiment, there is no need to receive and monitor any additional triggering signal. There is no need for additional connectivity between the waste collection vehicle 1 and the apparatus 5.

The waste collection management apparatus as disclosed herein is configured to receive and process the acquired images 4 to detect objects, and, for each detected object, provide a class of objects in a classification of objects and determine, amongst the detected objects, new objects entering the waste collection vehicle. Then, the apparatus 5 sends to a remote server information about the new objects, comprising at least the class of the new object, a time, and a location of the waste collection vehicle when the new object enters the waste collection vehicle.

For example, an object can be a bag containing waste, a packaging, a box, a bottle, a bulky item, . . . .

In an embodiment, the classification relates to waste sorting rules and is such that a type of waste collection tour can be determined from the classes of the objects collected during a given waste collection tour as will be further described below. For example, the classification of objects can include the following classes: black waste bags, yellow waste bags, cardboard, expanded polystyrene, plastic bottle, plastic bags, metal packaging, glass, fabrics, wood, yard waste, kitchen waste, construction waste, hazardous waste, etc . . . .

An object is referred to as a new object entering the waste collection vehicle when it is detected for the first time. It is possible that an object is not visible first, because it is hidden by other objects. In this situation, the object may not be detected immediately when it is dumped into the hopper. It may be detected at a later point, in subsequent acquired images. It is also possible that an object is visible in several images, or visible alternatively in some images and not in others as objects move into the hopper. In this situation, the object is determined as a new object when it is first detected, and then it is ignored.

In the following of the description, an object detected in a given image is referred to as a detection and is denoted $O_{k,j}$ where index k indicates the image and index j indicates the object.

Figure 7:
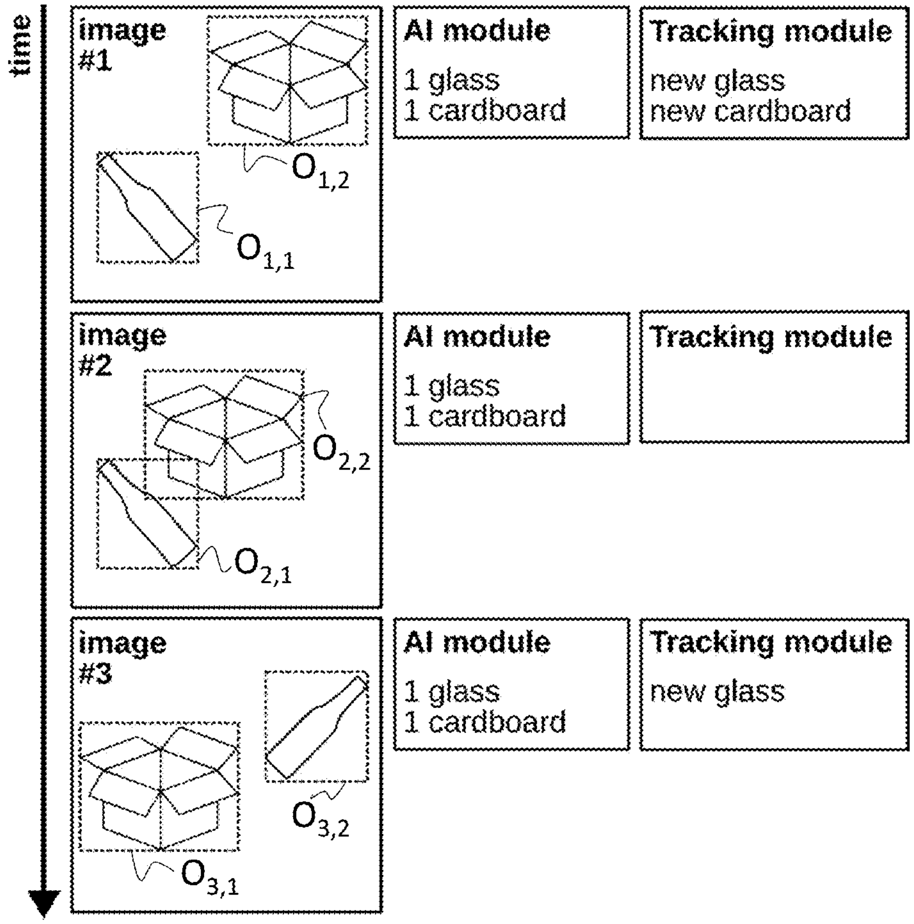
FIG. 7 is a schematic representation of an example of acquired images and processing performed by a waste collection management apparatus, based on the acquired images.

FIG. 7 illustrates the method performed by the apparatus 5 upon reception of acquired images. In FIG. 7, three images are received successively in time image #1, image #2 and image #3. For each image, two objects are detected $O_{1,1}$ and $O_{1,2}$ in image #1, $O_{2,1}$ and $O_{2,2}$ in image #2, and $O_{3,1}$ and $O_{3,2}$ in image #3. For illustration purposes, the objects $O_{1,1}$, $O_{2,1}$, and $O_{3,2}$ are represented as bottles and the objects $O_{1,2}$, $O_{2,2}$ and $O_{3,1}$ are represented as boxes. The AI module detects the objects and assigns a class to each of them: the class "glass" is assigned to the objects $O_{1,1}$, $O_{2,1}$, and $O_{3,2}$. The class "cardboard" is assigned to the objects $O_{1,2}$, $O_{2,2}$ and $O_{3,1}$. For each image, the tracking module determines if the two detected objects are new objects entering the waste collection vehicle. In image #1, both objects $O_{1,1}$ and $O_{1,2}$ are determined as new objects. In image #2, the bottle is in the same position as in image #1 but the box has moved compared to image #1. The tracking module determines that the detected objects $O_{2,1}$ and $O_{2,2}$ are the same as objects $O_{1,1}$ and $O_{1,2}$ detected in image #1, which means that no new object is determined in relation to image #2. In image #3, the bottle at the bottom left corner of image #1 and image #2 is no longer visible, the box of image #1 and image #2 is still visible and has continued to move towards the bottom left corner of image #3, and a bottle is visible on top right corner of the image. The tracking module determines that the detected object $O_{3,1}$ was already present in the previous images, and that the detected object $O_{3,2}$ is a new object entering the waste collection vehicle.

There are several ways of determining a new object entering the waste collection vehicle.

In a first embodiment, the apparatus 5 uses a machine learning module (or AI module) to detect objects in the acquired images and classify the objects according to the classification, and a tracking module to determine new objects amongst the detected objects. In this embodiment, the AI module provides, for each object detected in a given image, a position of the detected object in said given image, in addition to providing the class of the object. The position of the objects in the acquired images is used by the tracking module to determine whether the detected object is a new object or whether it was already present in a previous image. The determination is made by comparison with detections in previous images. Although not essential, the tracking module can also perform an estimation of movement of the detected objects and use the movement estimation to make the determination. Estimation of movement can be performed by using known solution e.g. Kalman filters.

The determination of new objects in this first embodiment will now be described in more details with reference to FIG. 8. In the method depicted in FIG. 8 for each detection $O_{k,j}$, a record is stored in the memory 63. Advantageously, the memory 63 stores records for the N previous images. For example, N is an integer within 40 and 100. Keeping a certain history of records ensures that objects which are no longer visible in the acquired images are not determined as new objects when they reappear in newly acquired images. An object which remains invisible in N successive images can be considered as definitively processed (picked up and compressed in the dumpster).

The records stored in memory 63 comprise at least the position of the detected object in the given image and information descriptive of the detected object. For example, the information descriptive of the object can be the class of the object.

Other descriptive information can be used. For example, rather than using the class of higher probability for a detected object, it is possible to use the probability distribution of the classes. Images can also be used. Using other descriptive information can provide a more precise tracking than just using the class of the object. For example, using the image can allow to differentiate similar objects based on their color. Using the distribution of probabilities allows to make better decisions when the model hesitates about the class of an object.

Other types of data can also be used in addition to the position and the descriptive information. For example, the record associated to a detection can include a score provided by the AI module which indicates the confidence associated to the detection made by the AI module. The score can advantageously be used by the tracking module when making determinations e.g. the score may need to exceed a certain threshold for a detection to be considered in the determination process. Or a comparison of scores can be used in addition to a comparison of classes (or probability distribution of classes) to make the determination.

Figure 8:
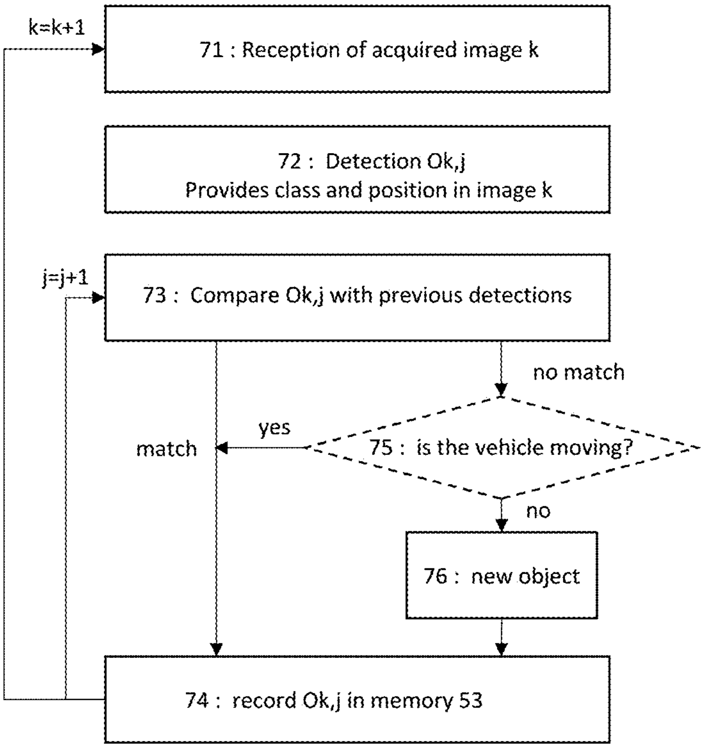
FIG. 8 is a flowchart describing the steps to performed for determining new objects amongst the detected object in a first embodiment of a waste collection management apparatus.

As illustrated in FIG. 8, at step 81, an acquired image k is received by the apparatus 5. At step 82, the AI module detects objects $O_{k,j}$ in image k and provides for each detection the class and the position in image k. At step 83, the detection $O_{k,j}$ is compared with previous detections recorded in memory 63. For example, the comparison starts with the most recent detections (that is the detections in the previous image k−1) and, if no match is found, continues with older detections.

When a match is found between the current detection $O_{k,j}$ and the previous detections stored in memory 63, the current detection $O_{k,j}$ is recorded in the memory 63 at step 84 and the method resumes at step 83 with the next detection $O_{k,j}+1$. When all detections in image k are processed, the method resumes at step 81 with the next acquired image k+1.

On the contrary when no match is found, optionally, at step 85, an additional check is done based on the speed of the waste collection vehicle to eliminate false positives (it is assumed that no waste is being dumped into the hopper when the waste collection vehicle is moving). When the speed of the waste collection vehicle is below a threshold, at step 86, the detected object is determined a as a new object. Otherwise, the detected object is determined as being a false positive and is ignored. Then at step 84, the current detection $O_{k,j}$ is recorded in the memory 63 and the method resumes at step 83 with the next detection $O_{k,j+1}$. When all detections in image k are processed, the method resumes at step 81 with the next acquired image k+1.

For example, the speed of the waste collection vehicle can be calculated from the positions provided by a location device embedded in the waste collection management apparatus 5. This implementation is advantageous because it limits the need for connectivity between the apparatus 5 and the waste collection vehicle 1.

The current detection $O_{k,j}$ and the previous detections stored in the memory 63 can be compared by applying known solutions like Intersection Of Union (IOU) or alternatives like Generalized Intersection Of Union (GIOU) or Complete Intersection Of Union (CIOU).

In a second embodiment, the determination of new objects is performed by the AI module. In this second embodiment, the AI module receives the acquired images as input, detects the objects in the acquired images and provides at least the class of the detected objects and an object identifier that uniquely identifies the detected object. The detected object is determined as a new object when the object identifier estimated by the AI module is different from the object identifiers of the objects detected in the previous images. This second embodiment requires that the AI model is trained to estimate the object identifier in addition to estimating the object class. This is more costly to implement than the first embodiment as many more training images are required to train the model, which need to be labelled manually.

In this second embodiment, although it is not needed for determining new objects, the AI module advantageously provides the position of the detected objects so that it can be included in the information sent to the remote server. For example, the position can be presented to the waste collection service operator or/and its client in connection with proof images to improve the management of the waste collection services. For example, proof images can be checked by a physical person and can be used to re-retrain the AI module.

Other determinations can be made by the apparatus 5 based on the acquired images and added to the information sent to the remote server. Advantageously, these other determinations are made by the same AI module which provides several estimations in parallel. For example, the apparatus 5 can determine, from the acquired images, a type of entrance into the waste collection vehicle. For example, the type of entrance can be a manual entrance, an entrance via a bin lifted by the waste collection vehicle, or via a bin lifted manually, or via a container which is being discharged into the waste collection vehicle (e.g. a street container or a container at a drop off point). Such data are advantageously presented to the waste service operator and/or its clients as they can help improve the management of the waste collection services.

In another example, when the waste collection vehicle is arranged to collect waste for at least two types of waste collection tours, the apparatus 5 determines, from the acquired images, the type of waste collection tour associated with the new objects and includes an indication of the type of waste collection tour in the information sent to the remote server. As will be further described below, this indication can be used to calculate a rate of waste contamination at the remote server, when the waste is being collected by multi-stream vehicles. For example, the acquired images would show which dumpster is closed when the images are captured and the type of waste collection tour can be derived from this knowledge.

The information about the new objects, generated at the apparatus 5, is sent to a remote server through a wireless connection. This information comprises at least the class of the new objects as well as a time and a location of the waste collection vehicle when the new objects entered the waste collection vehicle. Advantageously, for each new object, the following data are included in the information sent to the remote server: the class of the new object, the position of the new object, the score of the new object, the acquired image in which the new object was detected, the date and the time of capture of the acquired image, and the location of the waste collection vehicle when the image was acquired. When the waste collection vehicle is a multi-stream vehicle, an indication of the type of waste collection tour associated with the new object is also included. Depending on the functionalities required on the client side, and depending on the bandwidth available, some of the data listed above may be omitted, or other data may be included. For example, a short video showing the waste dumped into the hopper could be sent as well (e.g. a few images before and a few images after the waste is dumped). Also, when bins are identified by an electronic tag, an identifier of the bin can be included. As previously mentioned, the type of entrance into the waste collection vehicle can also be added.

Advantageously, the information can be packaged so as to limit the bandwidth required. For example, when several new objects are detected in the same acquired image, the data which are common to all new objects are sent only once (for example, the acquired image, the location of the waste collection vehicle, the date and time when the acquired image is captured are sent once for all new objects detected in the same acquired image).

Figure 9:
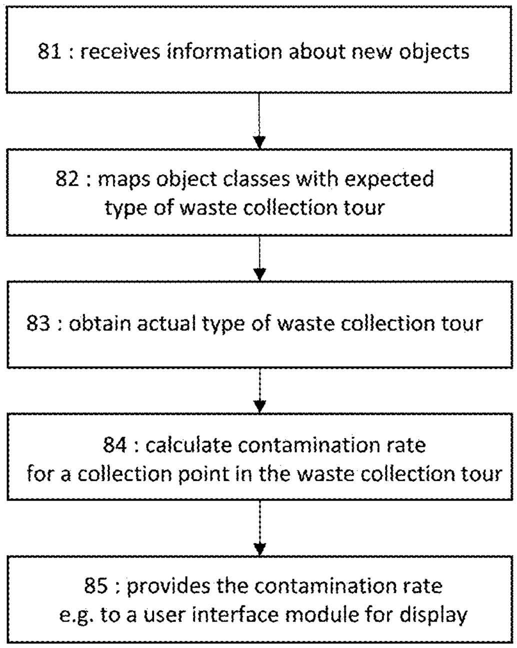
FIG. 9 is a flowchart describing the steps to performed at remote server to process information received from a waste collection apparatus of a waste collection vehicle.

On the side of the remote server, the information is received and processed before being made available to a user through a user interface. FIG. 9 is block diagram describing the steps performed at the remote server.

At step 91, the remote server receives, from a waste management apparatus of a waste collection vehicle, information about new objects entering the waste collection vehicle. This information comprises at least the class of the new objects and the time and location where the new objects have been collected. The time is used to associate a waste collection tour to the new objects. The location is used to associate a waste collection point within the waste collection tour.

At step 92, the class of the new objects are mapped with an expected type of waste collection tour based on sorting rules stored in a table at a remote server. For example, four different types of waste collection tour can be defined: residual waste, recyclable waste, biowaste and glasses.

At step 93, an actual type of the waste collection tour is obtained for the waste collection tour associated with the new objects. As will be further described below, there are several ways of obtaining the actual type of the waste collection tour associated with a new object.

At step 94, a rate of waste contamination is calculated, for a waste collection point in a waste collection tour, as a function of the number of new objects identified at said waste collection point during said waste collection tour, which classes are mapped with an expected type of waste collection tour other than the actual type determine for the waste collection tour. At step 95, the waste contamination rate is delivered e.g. to a user interface module.

Mapping the classes of the new objects with an expected type of waste collection tour at the remote server is advantageous because the mapping table used by the remote server can be updated at any time by the waste service operator or its clients. The mapping table can also be adapted client by client. For example, different cities may implement different sorting rules, so that a class of waste regarded as residual waste in one city, will be regarded as recyclable waste in another city. For example, yellow waste bags can be dedicated to recyclable waste in one city or to residual waste in another city.

In a first embodiment, when the waste collection vehicle is a single-stream vehicle, at step 93, the actual type of the waste collection tour is determined from the distribution of the classes of the new objects entering a waste collection vehicle during the given waste collection tour. This information varies as the waste collection tour proceeds. For example, the remote server waits for a certain number of new objects to be detected so as to obtain an actual type of waste collection tour which is reliable.

Advantageously, a weighting may be applied to the different types of waste collection tour when determining the actual type of waste collection tour from the distribution of classes of the new objects. For example, without weighting, a collection point with a total of 5 black waste bags, 7 plastic bags and 1 cardboard would be associated with a recyclable waste collection tour as the distribution is 8 recyclables items against 5 non-recyclable items. However, it is infrequent that black waste bags are placed in a recyclable bin or container. On the contrary, it is quite frequent that people make mistake about plastic bags and place them in non-recyclable bins or containers. With a weighting, it is possible to give more importance to classes for which errors are less frequent. For example, a weight of 2 can be given to black waste bags, a weight of 0.2 can be given to plastic bags, and a wait of 1 can be given to cardboards. With such a weighting, the distribution becomes 2*5=10 residual waste vs. 1+0.2*7=2.4 recyclable waste. And the actual type of waste collection tour is determined to be a non-recyclable waste collection tour.

Weighting can take into account several parameters, for example, how reliable the AI module is for detecting objects, how frequent it that the user makes sorting mistake in relation to a given class of objects, or even how big the objects are.

In a second embodiment, when the waste collection vehicle is a multi-stream vehicle, the information received from the waste management apparatus 5 comprises, for each new object, an indication of the actual type of waste collection tour associated with the new object. As disclosed above, this information is obtained by the AI module from the acquired image which shows which dumpster compartment(s) is/are closed when the waste is dumped into the hopper. In this second embodiment, at step 83, the indication of the type of waste collection tour associated with each new object is retrieved from the information sent by the apparatus 5.

For example, the user interface module can display a map where the collection points for a given collection tour period are displayed. For example, the collection point can be represented as a colored point, the color indicating the rate of contamination of the waste collected at said collection point during said collection tour. And when the user clicks on the point, access to further information can be provided such as the acquired image in which the new object was detected.

It should be appreciated by those skilled in the art that any block diagrams herein represent conceptual views of illustrative circuitry embodying the principles of the disclosure. Similarly, it will be appreciated that any flow charts, flow diagrams, state transition diagrams, and the like represent various processes which may be substantially implemented by circuitry.

Each described function, engine, block, step can be implemented in hardware, software, firmware, middleware, microcode, or any suitable combination thereof. If implemented in software, the functions, engines, blocks of the block diagrams and/or flowchart illustrations can be implemented by computer program instructions/software code, which may be stored or transmitted over a computer-readable medium, or loaded onto a general purpose computer, special purpose computer or other programmable processing apparatus and/or system to produce a machine, such that the computer program instructions or software code which execute on the computer or other programmable processing apparatus, create the means for implementing the functions described herein.

In the present description, block denoted as "means configured to perform . . . " or "module configured to perform . . . " (a certain function) shall be understood as functional blocks comprising circuitry that is adapted for performing or configured to perform a certain function. A means or module being configured to perform a certain function does, hence, not imply that such means necessarily is performing said function (at a given time instant). When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Graphic Processing Units (GPU), digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

As used herein, the term "and/or," includes any and all combinations of one or more of the associated listed items.

When an element is referred to as being "connected," or "coupled," to another element, it can be directly connected or coupled to the other element or intervening elements may be present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Benefits, other advantages, and solutions to problems have been described above with regard to specific embodiments. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

The invention claimed is:

1. A waste management apparatus to be mounted on a waste collection vehicle equipped with at least one optical sensor configured to acquire images of waste entering the waste collection vehicle, the waste management apparatus comprising at least one memory and at least one processor configured to process at least part of the acquired images to:

detect one or more objects, for each object detected in a given image, provide at least a class in a classification of objects, determine, amongst the detected objects, new objects entering the waste collection vehicle, and determine from the acquired images a type of entrance into the waste collection vehicle, wherein the type of entrance is one of: manual entrance, entrance from a bin lifted by the waste collection vehicle, entrance from a bin lifted manually, or entrance from a container discharged into the waste collection vehicle, wherein the container is a street container or a container at a drop off point;

send to a remote server information about the new objects, the information comprising at least the class of a new object, a time and a location of the waste collection vehicle when the new object entered the waste collection vehicle, wherein the type of entrance is included in the information sent to the remote server.

2. A waste management apparatus as claimed in claim 1, wherein at least one memory and at least one processor are configured to control the at least one optical sensor to acquire images continuously while the waste collection vehicle is in service.

3. A waste management apparatus as claimed in claim 1, wherein the at least one memory and at least one processor are further configured to determine if the waste collection vehicle is in motion and disregard new objects identified from images acquired while the waste collection vehicle is in motion.

4. A waste management apparatus as claimed in claim 1, wherein the object classification relates to sorting rules so that a type of waste collection tour can be determined from the classes of the objects collected during a given waste collection tour.

5. A waste management apparatus as claimed in claim 1, to be mounted on a waste collection vehicle arranged to collect waste for at least two types of waste collection tours, wherein the at least one memory and at least one processor are further configured to determine, from the acquired images, the type of waste collection tour associated with the new objects, and to include an indication of the type of waste collection tour in the information sent to the remote server.

6. A waste management apparatus as claimed in claim 1, wherein the at least one memory and at least one processor are further configured to provide, to for each object detected in a given image, a position in said given image, and determining new objects entering the waste collection vehicle comprises:

storing, in a memory, records corresponding to objects detected in previous images, a given record comprising at least the position of the given object in the given previous image and information descriptive of the given object, for each detected object in the current image:

comparing the position and the descriptive information of the detected object with the records in the memory, when no match is found determine that the detected object is a new object, storing in the memory a new record corresponding to the detected object in the current image.

7. A waste management apparatus as claimed in claim 6, wherein the comparison of the position and the descriptive information of the detected object with the records in the memory takes into account an estimation of movement of the detected object.

8. A waste management apparatus as claimed in claim 1, wherein the acquired images are processed through a machine learning module, the machine learning module detecting objects in a given image, and providing for each detected object, at least the class of the detected object and an object identifier that uniquely identifies the detected object, an object being determined as a new object when the object identifier is different from the identifiers of the objects detected in previous images.

9. A waste collection vehicle comprising a waste management apparatus as claimed in claim 1.

10. A computer implemented method for analyzing waste, the method comprising at least:

receiving from the waste management apparatus of claim 1, information about new objects entering a waste collection vehicle during a given waste collection tour, said information comprising at least, for each new object, an object class in a classification of objects, a time and a location of the waste collection vehicle when the new object entered the waste collection vehicle, mapping the class of the new objects with an expected type of waste collection tour based on sorting rules stored in a table, obtaining an actual type of the given waste collection tour, calculating a rate of waste contamination for a given location of the waste collection vehicle during the given waste collection tour as a function of the number of new objects identified at said given location which classes are mapped with an expected type of waste collection tour other than the actual type of the given waste collection tour, providing the rate of waste contamination.

11. A method for analyzing waste as claimed in claim 10, further comprising determining the actual type of a given waste collection tour from the distribution of the classes of the new objects entering a waste collection vehicle during the given waste collection tour.

12. A method for analyzing waste as claimed in claim 10, wherein the information received from the waste management apparatus comprises, for each new object, an indication of the actual type of waste collection tour associated with the new object.

13. A computer implemented method for managing waste at a waste collection vehicle, the method comprising processing acquired images of waste entering the waste collection vehicle to:

detect one or more objects, for each object detected in a given image, provide at least a position of the object in said given image and an object class in a classification of objects, identify, amongst the detected objects, new objects entering the waste collection vehicle;

determine from the acquired images a type of entrance into the waste collection vehicle, wherein the type of entrance is one of: manual entrance, entrance from a bin lifted by the waste collection vehicle, entrance from a bin lifted manually, or entrance from a container discharged into the waste collection vehicle, wherein the container is a street container or a container at a drop off point; and send to a remote server information about the new objects, the information comprising at least the class of a new object, a time and a location of the waste collection vehicle when the new object entered the waste collection vehicle, wherein the type of entrance is included in the information sent to the remote server.

14. A non-transitory storage medium storing a computer program comprising instructions which when executed by an apparatus causes the apparatus to perform at least the steps of a method of claim 13 as disclosed herein for analyzing waste at a remote server.

* * * * *